(12) United States Patent
Angaluri et al.

(10) Patent No.: US 10,944,839 B2
(45) Date of Patent: Mar. 9, 2021

(54) CONVEYING POTENTIAL COMMUNICATION METHODS FOR A USER OF A COMPUTING SYSTEM NETWORK

(71) Applicant: LENOVO ENTERPRISE SOLUTIONS (SINGAPORE) PTE. LTD., Singapore (SG)

(72) Inventors: Srihari V. Angaluri, Raleigh, NC (US); Nagananda Chumbalkar, Raleigh, NC (US); Gary D. Cudak, Wake Forest, NC (US); Ajay Dholakia, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 160 days.

(21) Appl. No.: 15/053,268

(22) Filed: Feb. 25, 2016

(65) Prior Publication Data
US 2017/0251067 A1    Aug. 31, 2017

(51) Int. Cl.
*G06F 15/16*   (2006.01)
*H04L 29/08*   (2006.01)

(52) U.S. Cl.
CPC .............. *H04L 67/18* (2013.01); *H04L 67/10* (2013.01); *H04L 67/125* (2013.01)

(58) Field of Classification Search
CPC ....................................................... H04L 67/18
See application file for complete search history.

(56) References Cited

U.S. PATENT DOCUMENTS

| | | | | |
|---|---|---|---|---|
| 9,319,856 B1* | 4/2016 | Riggs | ................... | G06Q 10/107 |
| 9,462,570 B1* | 10/2016 | Bostick | ................. | H04W 68/02 |
| 9,578,602 B1* | 2/2017 | Acharya | ........... | H04W 52/0258 |
| 2006/0004911 A1* | 1/2006 | Becker | ................. | G06Q 10/107 |
| | | | | 709/207 |
| 2006/0270419 A1* | 11/2006 | Crowley | ................. | H04L 51/00 |
| | | | | 455/456.2 |
| 2013/0238540 A1* | 9/2013 | O'Donoghue | ......... | G06Q 99/00 |
| | | | | 706/46 |
| 2014/0095617 A1* | 4/2014 | Chan | ....................... | H04L 67/06 |
| | | | | 709/204 |
| 2015/0373192 A1* | 12/2015 | Chau | ....................... | H04L 67/24 |
| | | | | 370/259 |
| 2016/0354285 A1* | 12/2016 | Nolan | ................... | A61J 7/0481 |

OTHER PUBLICATIONS

"Pidgin, the Universal Chat Client," https://pidgin.im/ (online), printed Jan. 12, 2016, 1 page.
"Google Voice—Features—Google Voice," https://www.google.com/googlevoice/about.html (online), printed Jan. 12, 2016, 7 pages.

* cited by examiner

*Primary Examiner* — Padma Mundur

(57) ABSTRACT

Conveying potential communication methods for a user of a computing system network, including: determining whether a user account for a real-time communications application (RTCA) is installed on a first inactive user device; if the user account for the RTCA is installed on the first inactive user device: calculating a proximity between a location of the first inactive user device and a user location; determining a status for the RTCA account based on the proximity between the location of the first inactive user device and the user location, wherein the status indicates a user's potential availability to utilize the RTCA account for communications; and sending the status for the RTCA account to another device.

20 Claims, 6 Drawing Sheets

CONVEYING POTENTIAL COMMUNICATION METHODS FOR A USER OF A COMPUTING SYSTEM NETWORK

BACKGROUND

Field of the Invention

The field of the invention is data processing, or, more specifically, methods, apparatus, and products for conveying potential communication methods for a user of a computing system network.

Description of Related Art

Social and professional communication over networks is ubiquitous. However, no single real-time communications application (RTCA) is used exclusively by every individual and in every setting. Instead, an abundance of RTCAs and protocols persist, and most individuals maintain multiple accounts across any number of RTCAs.

SUMMARY

Methods, apparatus, and products for conveying potential communication methods for a user of a computing system network are disclosed in this specification. Such conveying includes: determining whether a user account for a real-time communications application (RTCA) is installed on a first inactive user device; if the user account for the RTCA is installed on the first inactive user device: calculating a proximity between a location of the first inactive user device and a user location; determining a status for the RTCA account based on the proximity between the location of the first inactive user device and the user location, wherein the status indicates a user's potential availability to utilize the RTCA account for communications; and sending the status for the RTCA account to another device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
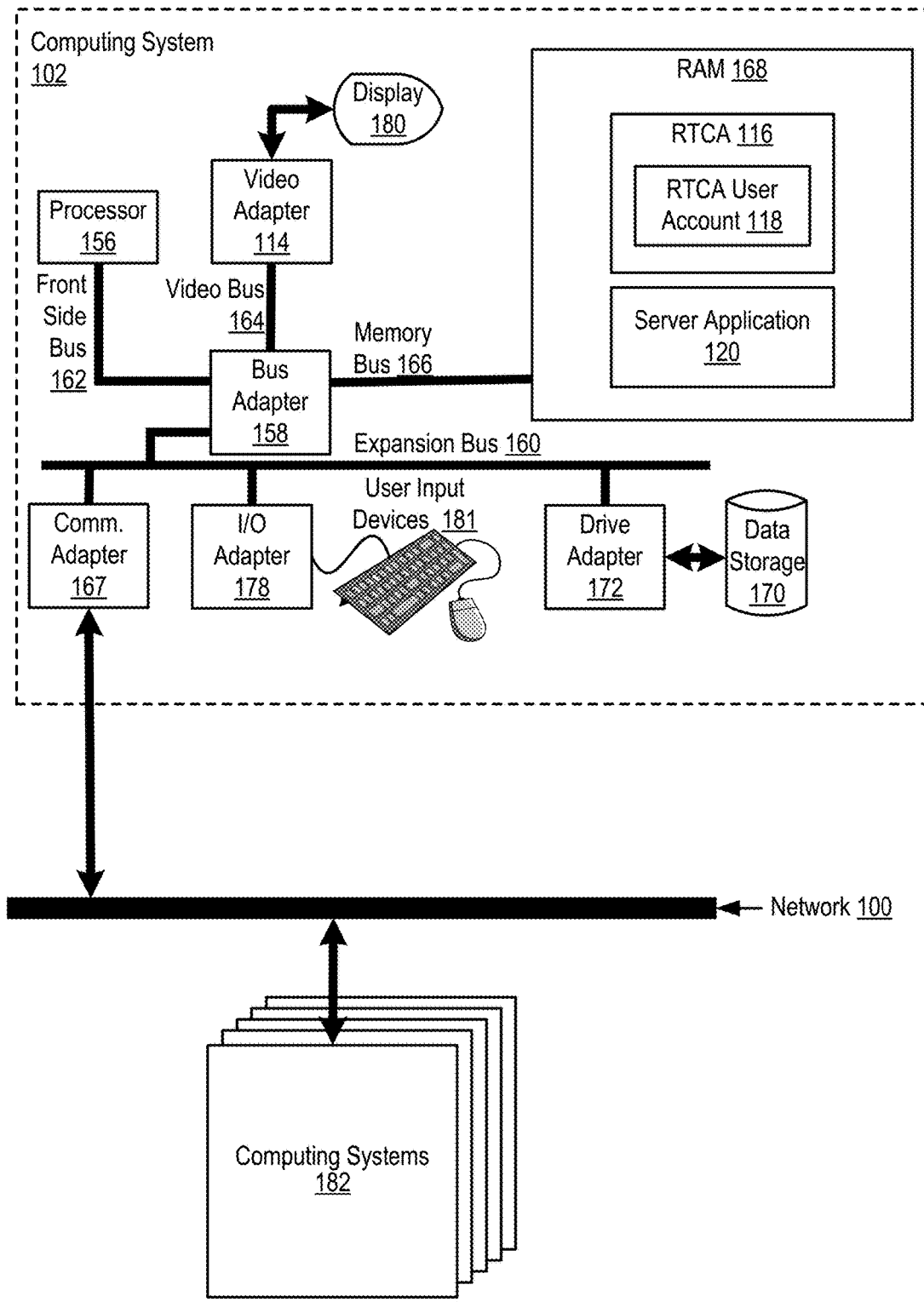
FIG. 1 sets forth an example system configured for conveying potential communication methods for a user of a computing system network.

Example methods, apparatus, and products for conveying potential communication methods for a user of a computing system network in accordance with the present disclosure are described with reference to the accompanying drawings, beginning with FIG. 1. FIG. 1 sets forth a block diagram of an example system configured for conveying potential communication methods for a user of a computing system network according to embodiments of the present disclosure. The system of FIG. 1 includes automated computing machinery in the form of an example computing system (102). The computing system (102) of FIG. 1 includes at least one computer processor (156) or 'CPU' as well as random access memory (168) ('RAM') which is connected through a high speed memory bus (166) and bus adapter (158) to processor (156) and to other components of the computing system (102).

Stored in RAM (168) is a real-time communications application (RTCA) (116). An RTCA may be any communications application enabling one user to communicate with another user. The RTCA (116) may be a client-side application that sends and receives RTCA messages from a server-side application.

The computing system (102) may have a variety of different RTCAs installed in RAM (168). Each RTCA (116) may be a different client-side application with features that distinguish it from other RTCAs. For example, one RTCA may be focused primarily on voice communication, while another may be focused on text messages or picture messages. Examples of RTCAs include, but are not limited to, social networks, instant messaging applications, voice over internet protocol applications, and message boards.

Each RTCA (116) may require a particular operating system and/or computing system hardware in order to be installed on the computing device (102). Compatibility, as the term is used in this specification, refers to the ability of the computing system to install the RTCA (116). For example, an RTCA may be compatible with the current version of a mobile operating system, but not compatible with previous versions.

Each RTCA (116) may include one or more RTCA user accounts (118). An RTCA user account (118) includes an identifier allowing messages targeted to and sourced from a user of the computing system (102) to be routed to the intended recipients. An RTCA user account allows continuity across devices, enabling a user with user credentials to set up an RTCA user account (118) on any device hosting the RTCA (116).

A user may have multiple RTCA user accounts (118) set up within a single RTCA. For example, a user may have an RTCA user account (118) for one group of contacts such as social contacts, and a separate RTCA user account (118) for a second group of contacts work colleagues. Further, the RTCA (116) may be installed in RAM (168) without having any RTCA user accounts (118) set up within the RTCA (116).

Also stored in RAM (168) is a server application (120), a module of computer program instructions that, when executed, causes the computing system (102) to carry out conveying potential communication methods for a user of a computing system network according to embodiments of the present disclosure. Such conveying includes: determining whether a user account for an RTCA is installed on a first inactive user device; if the user account for the RTCA is installed on the first inactive user device: calculating a proximity between a location of the first inactive user device and a user location; determining a status for the RTCA account based on the proximity between the location of the first inactive user device and the user location, where the status indicates a user's potential availability to utilize the RTCA account for communications; and sending the status for the RTCA account to another device.

The RTCA (116) and the server application (120) need not be on the same computing device as depicted in the example of FIG. 1. The server application (120) may reside on a separate system from the computing system hosting the RTCA (116). The server application (120) may reside on a user device or other computer system configured to host the server application (120).

As stated above, the status is determined by the server application (120). The status may be determined independent of any status of the RTCA user account (118) maintained by the RTCA (116). For example, the RTCA (116) may have a user-set status of "active," and the server application (120) may determine a different and more precise status of "available in ten minutes."

Also stored in RAM (168) is an operating system. Operating systems useful in computers configured for conveying potential communication methods for a user of a computing system network according to embodiments of the present disclosure include UNIX™, Linux™, Microsoft Windows™, AIX™, IBM's i™ Operating System, and others as will occur to those of skill in the art. Many components of such software typically are stored in non-volatile memory also, such as, for example, within data storage (170).

The computing system (102) of FIG. 1 includes disk drive adapter (172) coupled through expansion bus (160) and bus adapter (158) to processor (156) and other components of the computing system (102). Disk drive adapter (172) connects non-volatile data storage to the computing system (102) in the form of disk drive (170). Disk drive adapters useful in computers configured for conveying potential communication methods for a user of a computing system network according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (102) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (102) of FIG. 1 includes a video adapter (114), which is an example of an I/O adapter specially designed for graphic output to a display device (180) such as a display screen or computer monitor. Video adapter (114) is connected to processor (156) through a high speed video bus (164), bus adapter (158), and the front side bus (162), which is also a high speed bus.

The example computing system (102) of FIG. 1 includes a communications adapter (167) for data communications with other computing systems (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for conveying potential communication methods for a user of a computing system network according to embodiments of the present disclosure include modems for wired dial-up communications, Ethernet (IEEE 802.3) adapters for wired data communications, and 802.11 adapters for wireless data communications.

The arrangement of servers and other devices making up the example system illustrated in FIG. 1 are for explanation, not for limitation. Data processing systems useful according to various embodiments of the present disclosure may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present disclosure may be implemented on a variety of hardware platforms in addition to those illustrated in FIG. 1.

Figure 2:
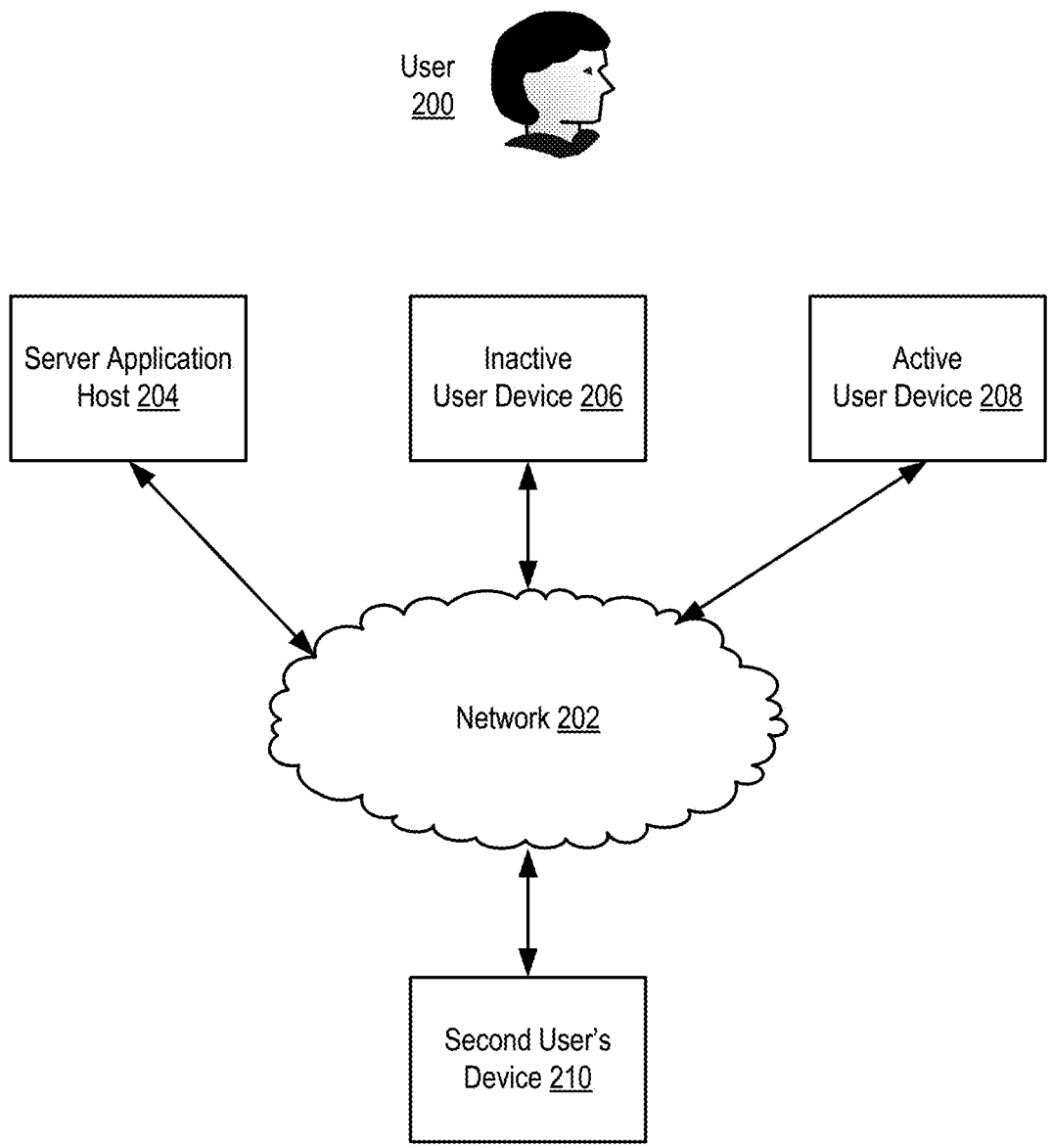
FIG. 2 sets forth an example system configured for conveying potential communication methods for a user of a computing system network.

For further explanation, FIG. 2 sets forth a block diagram of different computing devices configured for conveying potential communication methods for a user of a computing system network according to embodiments of the present invention. The example system of FIG. 2 includes a user (200), a server application host (204), an inactive user device (206), an active user device (208), and another device such as a second user's device (210) communicatively coupled to a network (202).

The example user (200) of FIG. 2 is an owner or holder of credentials for one or more RTCA user accounts. The availability of the user (200) to communicate using one or more RTCA user accounts may be determined based on the location of the user. The location of the user (200) may be inferred using various methods described below.

The example server application host (204) of FIG. 2 is a computing device as described in FIG. 1. Specifically, the server application host (204) is a computing system configured to host a server application suitable for determining whether a user account for an RTCA is installed on an inactive user device (206); if the user account for the RTCA is installed on the inactive user device (206): calculating a proximity between a location of the inactive user device (206) and a user location of the user (200); determining a status for the RTCA account based on the proximity between the location of the inactive user device (206) and the user location of the user (200), where the status indicates a user's (200) potential availability to utilize the RTCA account for communications; and sending the status for the RTCA account to another device, such as a second user's device (210). Additionally, or alternatively, the server application may be hosted on the inactive user device (206) and/or the active user device (208).

The example inactive user device (206) of FIG. 2 is a device under the control of the user (200). The inactive user device (206) may be categorized as inactive for various reasons. The inactive user device (206) may be categorized as inactive because the device is not currently in use. The inactive user device (206) may be categorized as inactive because one or more RTCAs are not installed on the device. Further, the inactive user device (206) may be categorized as inactive because one or more RTCA user accounts are not present or set up on the device.

The example active user device (208) of FIG. 2 is a device under the control of the user (200). The active user device (208) may be categorized as active for various reasons. The active user device (208) may be categorized as active because the device is currently in use by the user (200). The active user device (208) may be categorized as active because one or more RTCA user accounts have a user-set status indicating an active state.

In the example of FIG. 2, the inactive user device (206) and/or the active user device (208) may be registered with a server application such that the server application maintains an association between the user (200) and the inactive user device (206) and/or the active user device (208). The inactive user device (206) and/or the active user device (208) may periodically communicate with the server application to provide information about the inactive user device (206) and/or the active user device (208). Such communication may be accomplished using a client-side application installed on the inactive user device (206) and/or the active user device (208).

In the example of FIG. 2, the second user's device (210) is a device not under the control of the user (200). The second user's device (210) may be under the control of another person attempting to determine available communications methods through which the user (200) may be contacted. The second user's device (210) may request, from a server application, a status for one or more RTCAs and RTCA user accounts. The server application may respond by determining whether a user account for an RTCA is installed on an inactive user device (206); if the user account for the RTCA is installed on the inactive user device (206): calculating a proximity between a location of the inactive user device (206) and a user location of the user (200); determining a status for the RTCA account based on the proximity between the location of the inactive user device (206) and the user location of the user (200), wherein the status indicates a user's (200) potential availability to utilize the RTCA account for communications; and sending the status for the RTCA account to another device, in this example, a second user's device (210).

Figure 3:
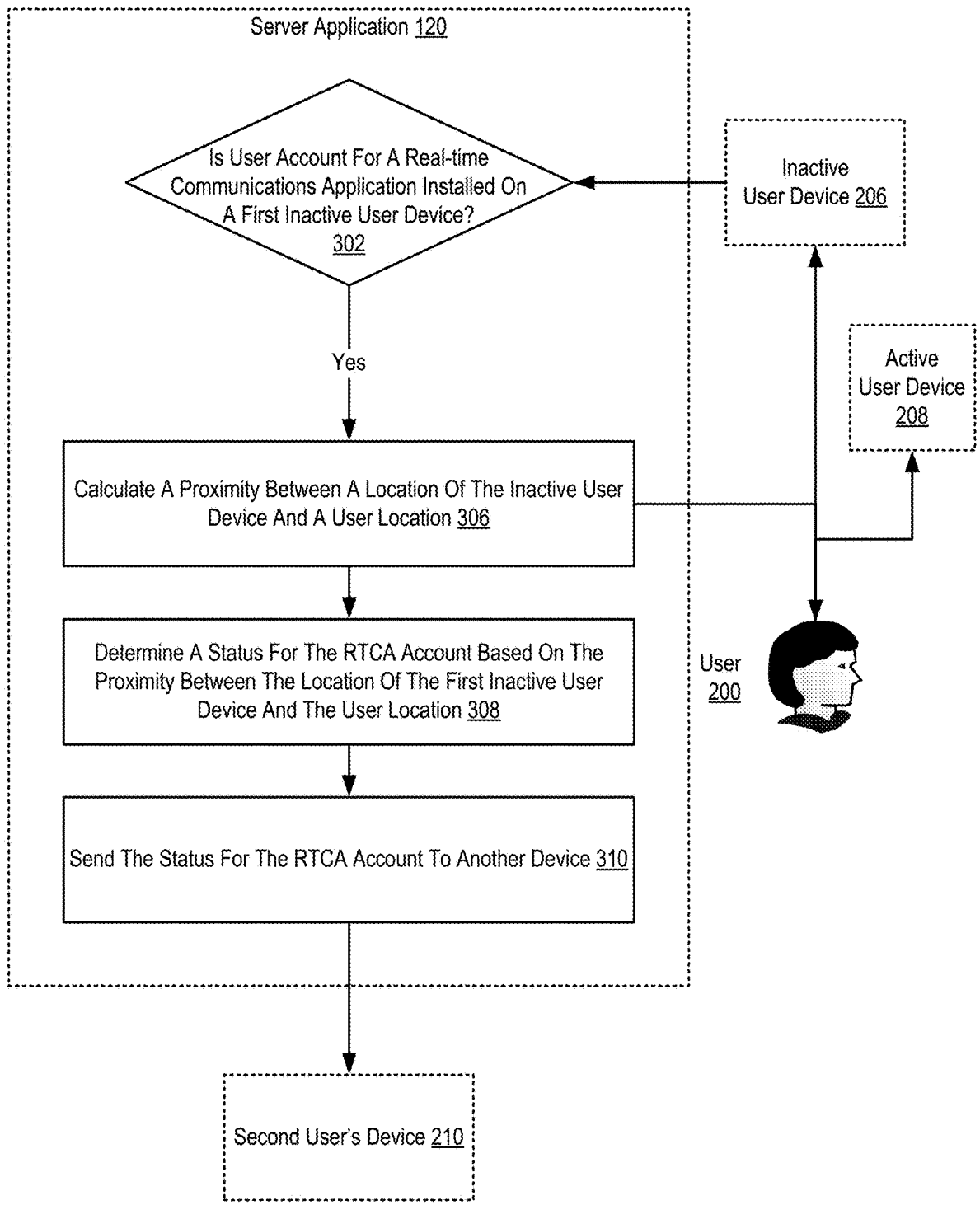
FIG. 3 sets forth a flow chart illustrating an exemplary method for conveying potential communication methods for a user of a computing system network.

For further explanation, FIG. 3 sets forth a flow chart illustrating an exemplary method for conveying potential communication methods for a user of a computing system network according to embodiments of the present invention. The method of FIG. 3 includes determining (302) whether a user account for an RTCA is installed on an inactive user device. Determining (302) whether a user account for an RTCA is installed on an inactive user device may be carried out by receiving, by the server application from the inactive user device, installed application information. The installed application information may be searched by the server application for the RTCA. If the RTCA is found within the installed application information, the server application may then determine whether the user account has been set up on the RTCA. Determining whether the user account has been set up on the RTCA may include receiving, by the server application from the inactive user device, a list of user accounts for the RTCA. The list of user accounts for the RTCA may be searched by the server application for the user account for the RTCA. If the user account for the RTCA is installed on the inactive user device (206), the example method of FIG. 3 continues by calculating (306) a proximity between a location of the inactive user device and a user location. Calculating (306) a proximity between a location of the inactive user device (206) and the user location may be carried out in a variety of ways. The user location, for example, may be determined based on the location of an active user device. Specifically, the server application may determine the location of a currently active user device registered to the user. The server application may then infer that the current location of the user is the same as the location of the active user device. The user location may also be determined based on a user calendar. The server application, for example, may have access to the calendar of the user, and based on the information in the calendar, the server application may infer the location of the user as the location of an appointment.

The location of the inactive user device (206) may also be determined in a variety of ways. The inactive user device may include an application that periodically provides location information directly or indirectly to the server application. Such a location may be provided indirectly using an intermediate device, such as an active user device or another inactive user device. For example, an active user device may be connected to an inactive user device through a communications link (e.g., wired Ethernet link, WiFi, Bluetooth, etc.). The active user device may provide information, to the server application, about the communications link. The server application (120) may then utilize knowledge of the communications link and location of the active user device to infer the location of the inactive user device. For example, if the inactive user device is connected to the active user device over a short-range communications network (e.g., Bluetooth), the location of the inactive user device may be determined to be within the standard range of that communications network from the active user device.

The method of FIG. 3 also includes determining (308) a status for the RTCA account based on the proximity between the location of the inactive user device and the user location. In the method of FIG. 2, the status indicates a user's potential availability to utilize the RTCA account for communications. Determining (308) a status for the RTCA account may be carried out by comparing the location of the inactive user device and the user location to obtain a distance between the inactive user device and the user location. The distance may then be used to obtain a status by, for example, using the distance as a key to a lookup table to obtain a corresponding status. Alternatively, the distance may be provided directly as part of the status. The status may be a point on an availability scale, such as a word (e.g., available, unavailable) or color (e.g., green for available, red for unavailable). The status may include information related to physical or temporal proximity. For example, the status for the RTCA may include an expected availability time. Determining an expected availability time may include searching a repository of information about the user. This repository of information may include a user calendar, historical device usage data, and historical location data for the user.

The method of FIG. 3 also includes sending (310) the status for the RTCA account to another device, such as a second user's device (210). Sending (310) the status for the RTCA account to another device (210) may be carried out by transmitting the status to a client application executing on the second user's device (210). The client application on the second user's device (210) may receive status for multiple RTCA accounts associated with the user. A second user, through the second user's device (210), may then select one of the RTCA accounts to contact the user based on the received statuses.

Figure 4:
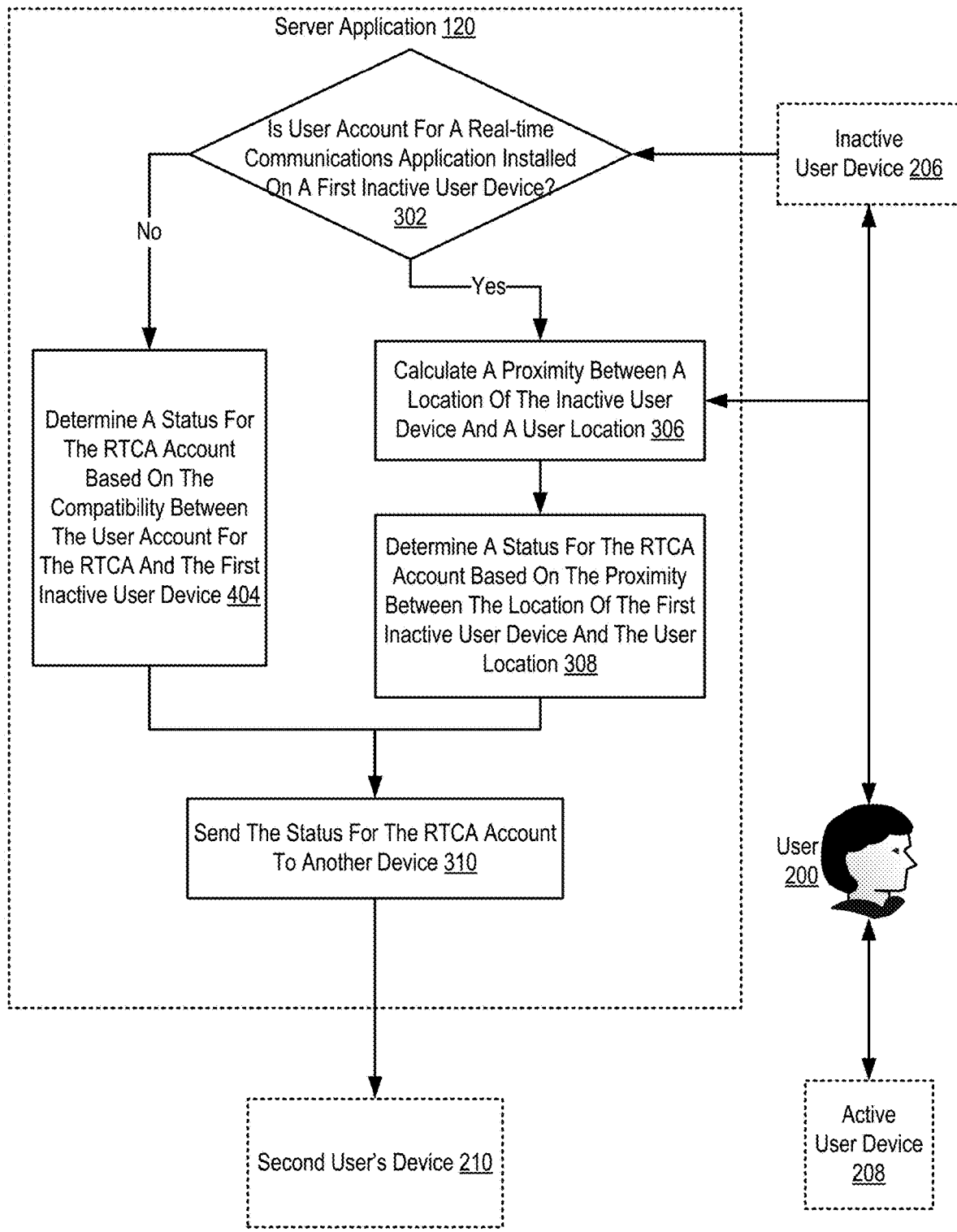
FIG. 4 sets forth a flow chart illustrating an exemplary method for conveying potential communication methods for a user of a computing system network.

For further explanation, FIG. 4 sets forth a flow chart illustrating a further exemplary method for conveying potential communication methods for a user of a computing system network according to embodiments of the present invention. The method of FIG. 4 is similar to the method of FIG. 3 in that the method of FIG. 4 also includes determining (302) whether a user account for an RTCA is installed on a first inactive user device; if the user account for the RTCA is installed on the first inactive user device: calculating (306) a proximity between a location of the first inactive user device and a user location; determining (308) a status for the RTCA account based on the proximity between the location of the first inactive user device and the user location; and sending (310) the status for the RTCA account to another device.

The method of FIG. 4 differs from the method of FIG. 3, however in that, in the method of FIG. 4, if the user account for the RTCA is not installed on the inactive user device (206), the method continues by determining (404) a status for the RTCA account based on a compatibility between the user account for the RTCA and the inactive user device (206) and sending (310) the status for the RTCA account to another device. Such a status indicates a user's potential availability to utilize the RTCA account for communications.

In the method of FIG. 4, determining (404) a status for the RTCA account based on the compatibility between the user account for the RTCA and the inactive user device may be carried out by determining the hardware and software requirements for installing the RTCA on a device, and comparing those requirements to the hardware and software of the inactive user device. If the inactive user device satisfies the hardware and software requirements of the RTCA, the application server may determine that the inactive user device has a status indicating that the RTCA is potentially available for the inactive user device. If the inactive user device does not satisfy the hardware and software requirements of the RTCA, the application server may determine that the inactive user device has a status indicating that the RTCA is unavailable on the inactive user device.

Figure 5:
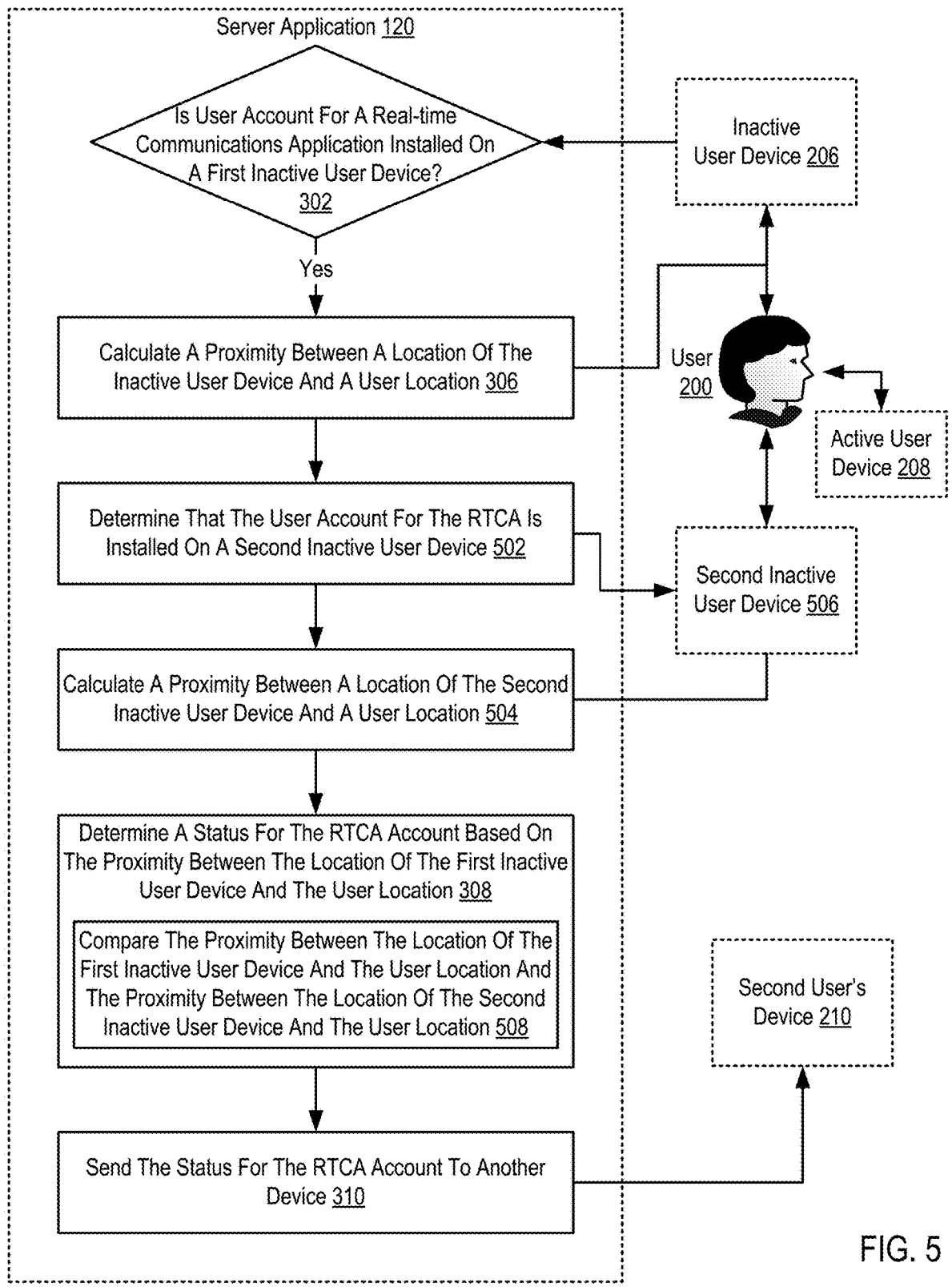
FIG. 5 sets forth a flow chart illustrating an exemplary method for conveying potential communication methods for a user of a computing system network.

For further explanation, FIG. 5 sets forth a flow chart illustrating another example method for conveying potential communication methods for a user of a computing system network according to embodiments of the present invention. The method of FIG. 5 is similar to the method of FIG. 3 in that the method of FIG. 5 also includes determining (302) whether a user account for an RTCA is installed on a first inactive user device; if the user account for the RTCA is installed on the first inactive user device: calculating (306) a proximity between a location of the first inactive user device and a user location; determining (308) a status for the RTCA account based on the proximity between the location of the first inactive user device and the user location; and sending (310) the status for the RTCA account to another device.

The method of FIG. 5 differs from the method of FIG. 3 however, in that the method of FIG. 5 also includes determining (502) that the user account for the RTCA is installed on a second inactive user device (506) and calculating (504) a proximity between a location of the second inactive user device and the user location. Such determination and calculation may be carried out in manners set forth above with respect to the method of FIG. 3 and the first inactive user device (206).

FIG. 5 also differs from FIG. 3 in that determining (308) a status for the RTCA account based on the proximity between the location of the first inactive user device and the user location may also include comparing the proximity between the location of the first inactive user device and the user location and the proximity between the location of the second inactive user device and the user location (508). For example, the server application may determine the proximity between a user and the user's mobile phone to be within 3 meters, and the proximity between the user and the user's laptop to be within 10 meters. The server application may compare the distance between the user and the user's mobile phone with the distance between the user and the user's laptop to determine that the user's mobile phone is closer to the user. The server application may then use the shorter distance (3 meters) to identify a corresponding status, (e.g., "immediately available").

Determining the status for the RTCA account may be carried out using a rating and a status policy. The rating may be a score assigned to an inactive user device based on a combination of characteristics, including proximity to user location and compatibility with the RTCA and RTCA user account. The server application may determine a rating for each user device known to the server application, and use the status policy to select the user device and status to send to the other device. The status policy may dictate which status to send to the other device based on a comparison of two or more ratings.

For example, a first inactive user device may be in close proximity to the user (e.g., same room or building) and may be compatible with the RTCA user account, but does not have the RTCA installed. This first inactive user device may be given a rating of high. A second inactive user device may have the RTCA user account installed, but may not be in close proximity to the user (e.g., over 100 meters away). The server application may give this second inactive user device a rating of low. The server application may then compare the two ratings based on the status policy, and send the status of the first inactive user device (e.g., "nearby but account not installed") to the other device.

Figure 6:
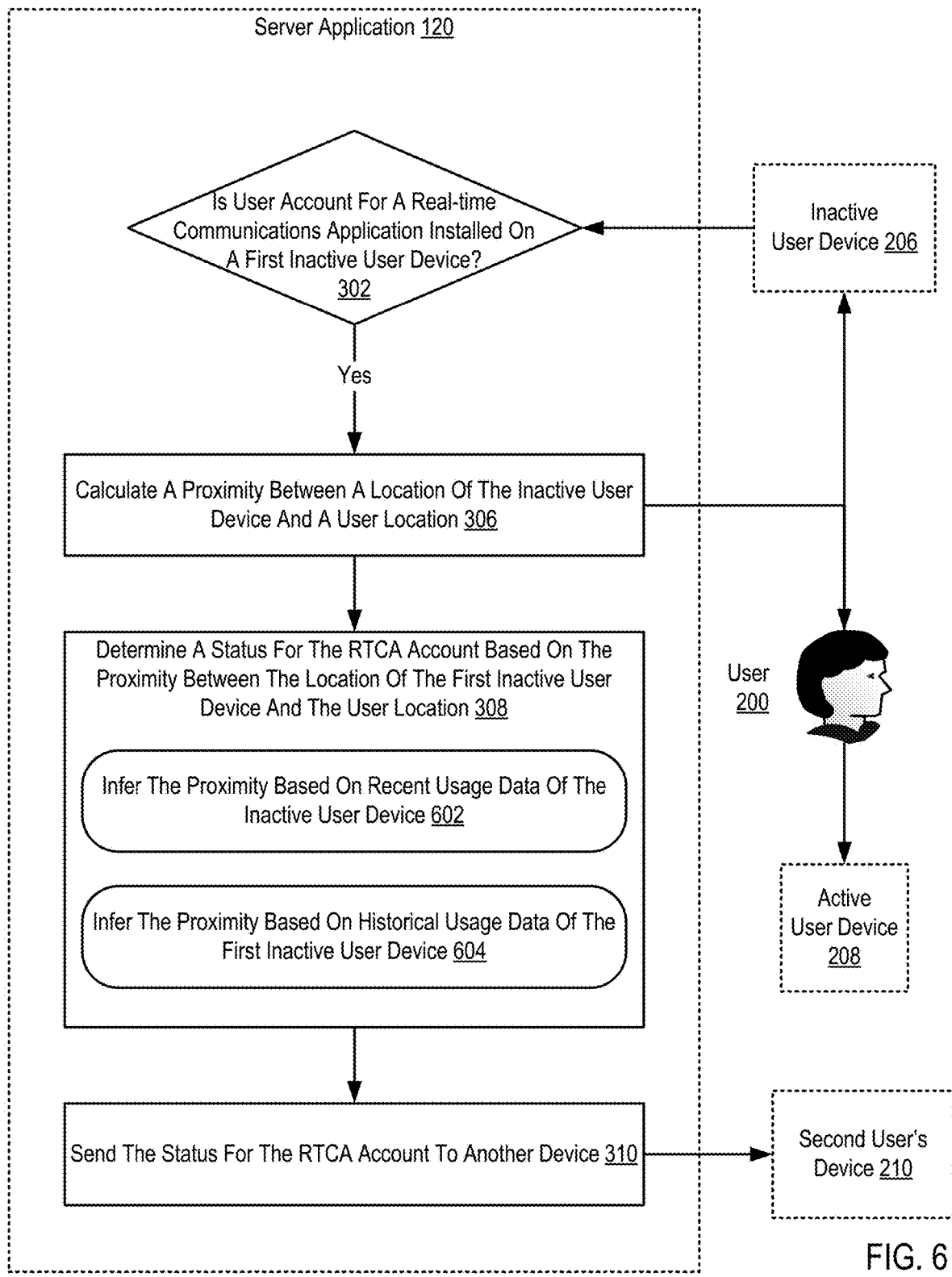
FIG. 6 sets forth a flow chart illustrating another example method for conveying potential communication methods for a user of a computing system network according to embodiments of the present invention.

For further explanation, FIG. 6 sets forth a flow chart illustrating another example method for conveying potential communication methods for a user of a computing system network according to embodiments of the present invention. The method of FIG. 6 is similar to the method of FIG. 3 in that the method of FIG. 6 also includes determining (302) whether a user account for an RTCA is installed on a first inactive user device; if the user account for the RTCA is installed on the first inactive user device: calculating (306) a proximity between a location of the first inactive user device and a user location; determining (308) a status for the RTCA account based on the proximity between the location of the first inactive user device and the user location; and sending (310) the status for the RTCA account to another device.

The method of FIG. 6 differs from the method of FIG. 3, however, in that determining (308) a status for the RTCA account based on the proximity between the location of the first inactive user device and the user location may be carried out by inferring (602) the proximity based on recent usage data of the first inactive user device. Inferring (602) the proximity based on recent usage data of the first inactive user device may be carried out by accessing a repository of recent usage data to determine whether the first inactive device has been used in the recent past, and identifying a proximity based on the time of last usage. For example, an inactive user device that has been used very recently (e.g., within the last 15 minutes) may be inferred as having a close proximity (or be given a high rating), and an inactive user device that has not been used recently (e.g., used over five hours ago) may be inferred as not having a close proximity (or be given a low rating).

Also in the method of FIG. 6, determining (308) a status for the RTCA account based on the proximity between the location of the first inactive user device and the user location (308) may be carried out by inferring (604) the proximity based on historical usage data of the first inactive user device. Inferring (604) the proximity based on historical usage data of the first inactive user device may be carried out by accessing a repository of historical usage data to determine a pattern of usage. A likelihood of immediate usage may be calculated based on the pattern of usage. For example, the historical usage data may present a pattern of usage for the current time and day. That pattern of usage may indicate that the inactive usage device is infrequently used during the current time and day. The pattern of usage may further indicate that the inactive usage device is frequently used on the same day at a point one hour from the current time. The status for the inactive user device may then be determined based on a prediction that the inactive usage device will be in use in an hour (e.g., "available in one hour").

The above-described processes for conveying potential communication methods for a user of a computing system network may be utilized to determine a time and RTCA for a group meeting. Each status for the RTCAs of each user may be compiled and searched to determine a single best time and RTCA for each member of the group.

Exemplary embodiments of the present invention are described largely in the context of a fully functional computer system for conveying potential communication methods for a user of a computing system network. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a computing device,
determining, for a particular one of a plurality of real-time communications applications (RTCAs) common to a first user, whether one or more RTCA user accounts are installed on a first inactive user device;
for a particular one of the one or more RTCA user accounts for the particular RTCA, if the particular RTCA user account is installed on the first inactive user device:
inferring a proximity between a location of the first inactive user device and a user location of the first user based on recent usage data of the first inactive user device retrieved from a repository and on a time of last usage;
determining a status for the particular RTCA user account based on the proximity between the location of the first inactive user device and the first user location, wherein the status indicates a potential availability of the first user to utilize the particular RTCA user account for communications, and wherein the status comprises an expected availability time calculated based on historical device usage data and on historical location data for the first user; and
sending, to a device of a second user, the status of the particular RTCA user account.

2. The method of claim 1, further comprising:
for the particular one of the one or more RTCA user accounts for the particular RTCA, if the particular RTCA user account is not installed on the first inactive user device:
determining a status for the particular RTCA user account based on a comparison of hardware and software requirements for installing the RTCA and hardware and software of the first inactive user device, wherein the status indicates a potential availability of the first user to utilize the RTCA user account for communications; and
sending the status of the particular RTCA user account to another device.

3. The method of claim 1, further comprising:
determining, for a particular one of the plurality of RTCAs common to the first user, that one or more RTCA user accounts are installed on a second inactive user device; and
calculating a proximity between a location of the second inactive user device and the first user location,
wherein determining the status for the respective RTCA user account comprises comparing the proximity between the location of the first inactive user device and the first user location and the proximity between the location of the second inactive user device and the first user location.

4. The method of claim 1, wherein inferring the proximity between the location of the first inactive user device and the first user location further comprises inferring the proximity based on a pattern of usage determined from historical usage data of the first inactive user device.

5. The method of claim 1, wherein the first user location is determined based on a location of an active user device.

6. The method of claim 1, wherein the first user location is determined based on a calendar of the first user.

7. The method of claim 1, wherein determining the status for the particular RTCA user account comprises:
determining a rating for each user device, wherein the rating is assigned to an inactive user device based on the proximity between the location of the first inactive user device and the first user location and compatibility with the particular RTCA and particular RTCA user account; and
selecting, using a status policy, the user device and the status, wherein the status policy determines the status based on a comparison of two or more ratings.

8. An apparatus comprising a computing device, a computer processor, and a computer memory operatively coupled to the computer processor, the computer memory having disposed within it computer program instructions that, when executed by the computer processor, cause the apparatus to carry out the steps of:
determining, for a particular one of a plurality of real-time communications applications (RTCAs) common to a first user, whether one or more RTCA user accounts are installed on a first inactive user device;

for a particular one of the one or more RTCA user accounts for the particular RTCA, if the particular RTCA user account is installed on the first inactive user device:
  inferring a proximity between a location of the first inactive user device and a user location of the first user based on recent usage data of the first inactive user device retrieved from a repository and on a time of last usage;
  determining a status for the particular RTCA user account based on the proximity between the location of the first inactive user device and the first user location, wherein the status indicates a potential availability of the first user to utilize the particular RTCA user account for communications, and wherein the status comprises an expected availability time calculated based on historical device usage data and on historical location data for the first user; and
sending, to a device of a second user, the status of the particular RTCA user account.

9. The apparatus of claim 8, wherein the computer program instructions that, when executed by the computer processor, further cause the apparatus to carry out the steps of:
  for the particular one of the one or more RTCA user accounts for the particular RTCA, if the particular RTCA user account is not installed on the first inactive user device:
    determining a status for the particular RTCA user account based on a comparison of hardware and software requirements for installing the RTCA and hardware and software of the first inactive user device, wherein the status indicates a potential availability of the first user to utilize the RTCA user account for communications; and
  sending the status of the particular RTCA user account to another device.

10. The apparatus of claim 8, wherein the computer program instructions that, when executed by the computer processor, further cause the apparatus to carry out the steps of:
  determining, for a particular one of the plurality of RTCAs common to the first user, that one or more RTCA user accounts are installed on a second inactive user device; and
  calculating a proximity between a location of the second inactive user device and the first user location,
  wherein determining the status for each respective RTCA user account comprises comparing the proximity between the location of the first inactive user device and the first user location and the proximity between the location of the second inactive user device and the first user location.

11. The apparatus of claim 8, wherein inferring the proximity between the location of the first inactive user device and the first user location further comprises inferring the proximity based on a pattern of usage determined from historical usage data of the first inactive user device.

12. The apparatus of claim 8, wherein the first user location is determined based on a location of an active user device.

13. The apparatus of claim 8, wherein the first user location is determined based on a calendar of the user.

14. The apparatus of claim 8, wherein determining the status for the particular RTCA user account comprises:
  determining a rating for each user device, wherein the rating is assigned to an inactive user device based on the proximity between the location of the first inactive user device and the first user location and compatibility with the particular RTCA and particular RTCA user account; and
  selecting, using a status policy, the user device and the status, wherein the status policy determines the status based on a comparison of two or more ratings.

15. A computer program product including a non-transitory computer readable medium, the computer program product comprising computer program instructions that, when executed, cause a computer to carry out the steps of:
  determining, for a particular one of a plurality of real-time communications applications (RTCAs) common to a first user, whether one or more RTCA user accounts are installed on a first inactive user device;
  for a particular one of the one or more RTCA user accounts for the particular RTCA, if the particular RTCA user account is installed on the first inactive user device:
    inferring a proximity between a location of the first inactive user device and a user location of the first user based on recent usage data of the first inactive user device retrieved from a repository and on a time of last usage;
    determining a status for the particular RTCA user account based on the proximity between the location of the first inactive user device and the first user location, wherein the status indicates a potential availability of the first user to utilize the particular RTCA user account for communications, and wherein the status comprises an expected availability time calculated based on historical device usage data and on historical location data for the first user; and
  sending, to a device of a second user, the status of the particular RTCA user account.

16. The computer program product of claim 15, wherein the computer program instructions that, when executed, further cause the computer to carry out the steps of:
  for the particular one of the one or more RTCA user accounts for the particular RTCA, if the particular RTCA user account is not installed on the first inactive user device:
    determining a status for the particular RTCA user account based on a comparison of hardware and software requirements for installing the RTCA and hardware and software of the first inactive user device, wherein the status indicates a potential availability of the first user to utilize the RTCA user account for communications; and
  sending the status of the particular RTCA user account to another device.

17. The computer program product of claim 15, wherein the computer program instructions that, when executed, further cause the computer to carry out the steps of:
  determining, for a particular one of the plurality of RTCAs common to the first user, that one or more RTCA user accounts are installed on a second inactive user device; and
  calculating a proximity between a location of the second inactive user device and the first user location,
  wherein determining the status for each respective RTCA user account comprises comparing the proximity between the location of the first inactive user device and the first user location and the proximity between the location of the second inactive user device and the first user location.

18. The computer program product of claim 15, wherein inferring the proximity between the location of the first inactive user device and the first user location further comprises inferring the proximity based on a pattern of usage determined from historical usage data of the first inactive user device.

19. The computer program product of claim 15, wherein the first user location is determined based on a location of an active user device.

20. The computer program product of claim 15, wherein the first user location is determined based on a calendar of the user.

* * * * *